H. BROCKMEYER.
DISK SUPPORTING ARM.
APPLICATION FILED JULY 2, 1912.
1,043,666.
Patented Nov. 5, 1912.
2 SHEETS—SHEET 1.
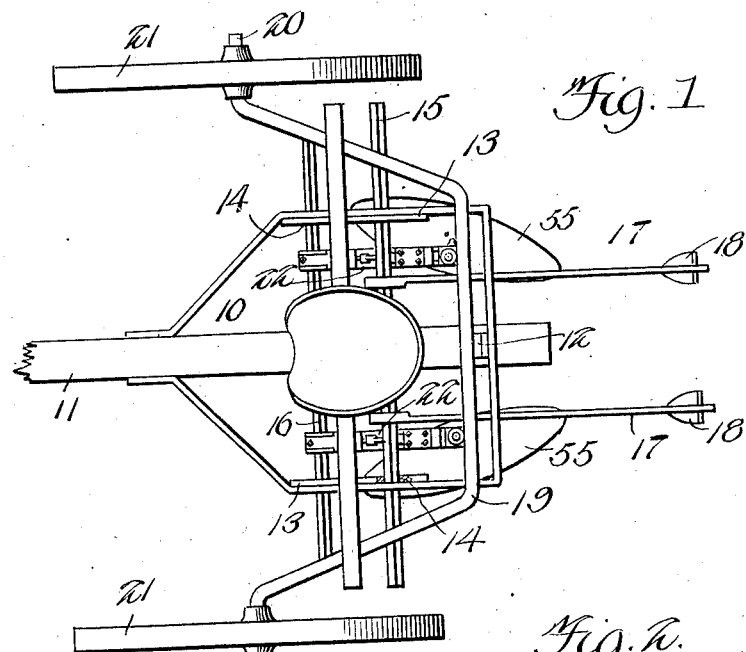
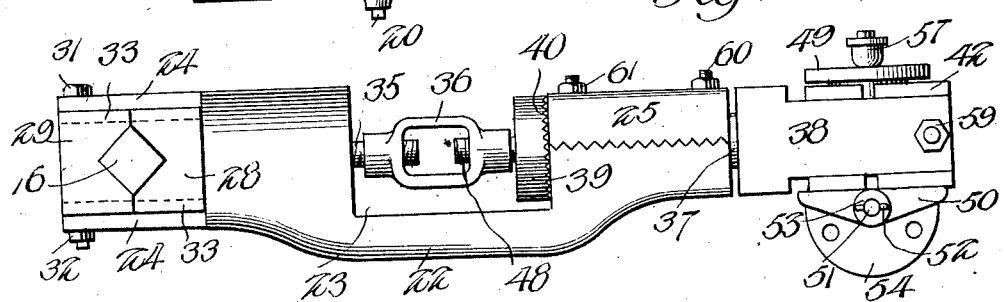
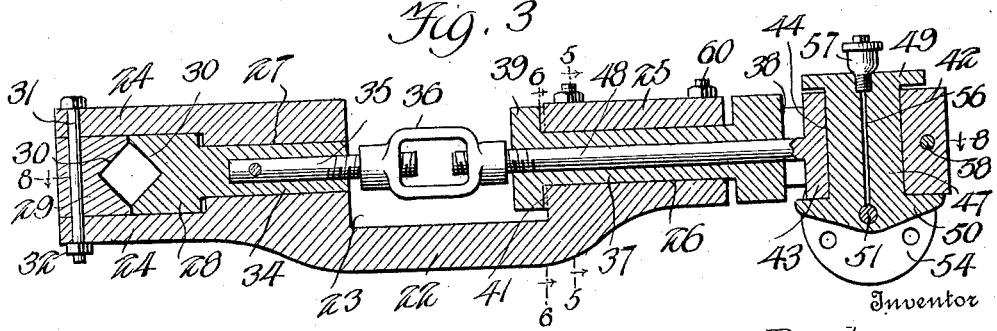
Inventor
Henry Brockmeyer
Witnesses
Harrison Ott
By Victor J. Evans
Attorney

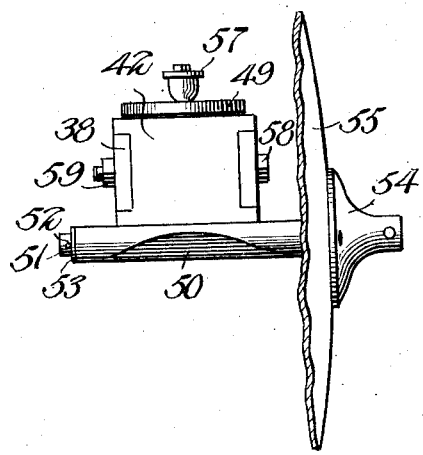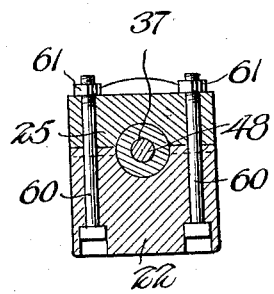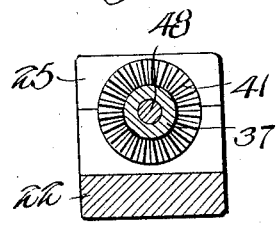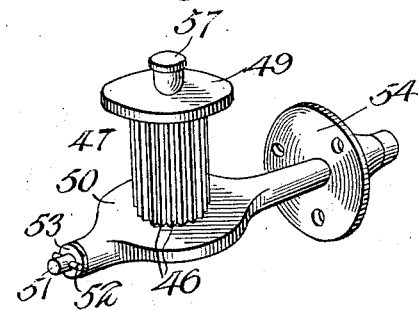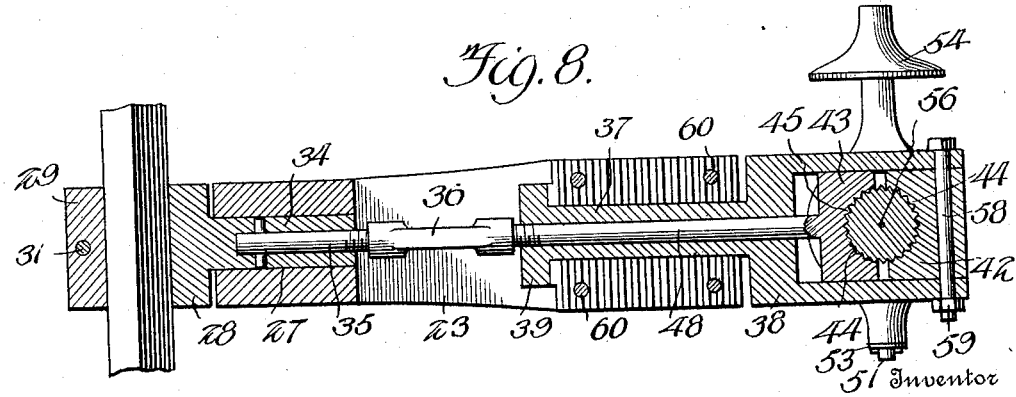

_UNITED STATES PATENT OFFICE._

HENRY BROCKMEYER, OF IRVING, KANSAS.

DISK-SUPPORTING ARM.

1,043,666.  Specification of Letters Patent.  Patented Nov. 5, 1912.

Application filed July 2, 1912. Serial No. 707,315.

_To all whom it may concern:_

Be it known that I, HENRY BROCKMEYER, a citizen of the United States, residing at Irving, in the county of Marshall and State of Kansas, have invented new and useful Improvements in Disk-Supporting Arms, of which the following is a specification.

The invention relates to disk supporting arms and more particularly to the class of adjustable disk supporting arms for cultivators or the like.

The primary object of the invention is the provision of a supporting arm of this character wherein a cultivating disk will be supported, so that the same may be angularly adjusted for the proper working of the ground and the arm is capable of ready removal from the cultivator frame should it be desired.

Another object of the invention is the provision of an arm of this character wherein the same may be readily adjusted on the cultivator frame and also securely fastened thereto, so as to properly support a disk in working relation to the ground.

A further object of the invention is the provision of an arm of this character wherein on the employment of a plurality of the same a series of cultivator disks may be set level and all have the same angle to the ground, whereby they may throw dirt away from the growing plants or up to the same as the occasion may require.

A still further object of the invention is the provision of a supporting arm of this character wherein the cultivator spindle may be conveniently lubricated during the working of the cultivator, the disk being capable of adjustment in various angles and sustained in its adjusted position.

A still further object of the invention is the provision of a supporting arm of this character which is simple in construction, strong, durable, capable of being mounted upon varying size cultivators without altering the parts thereof or reconstructing the same, and also which may be manufactured at a minimum cost.

With these and other objects in view the invention consists in the construction, combination and arrangement of parts as will be hereinafter more fully described, illustrated in the accompanying drawings, and pointed out in the claims hereunto appended.

In the drawings: Figure 1 is a top plan view of a wheeled cultivator showing the disk supporting arm constructed in accordance with the invention applied thereto.
Fig. 2 is an enlarged side elevation of the disk supporting arm. Fig. 3 is an enlarged vertical longitudinal sectional view through the same. Fig. 4 is an end elevation of the arm. Fig. 5 is a sectional view on the line 5—5 of Fig. 3. Fig. 6 is a sectional view on the line 6—6 of Fig. 3. Fig. 7 is a perspective view of the turning hub and disk supporting spindle housing detached from the arm. Fig. 8 is a sectional view on the line 8—8 of Fig. 3.

Similar reference characters indicate corresponding parts throughout the several views in the drawings.

Referring to the drawings by numerals the cultivator comprises a rectangular frame 10 secured at its forward end to a tongue 11 whereby the machine is drawn forwardly, the rear end of the tongue being provided with a right angular plate 12 to which the rear end of the frame is secured. Secured to the opposite sides of the frame is a pair of hangers 13 which are provided with bearings 14 for the reception of two rocking bars 15 and 16 respectively. Adjustably secured to the bar 15 is a pair of beams 17, the same carrying the usual shovels 18. Each of the bars 15 and 16 is of squared formation in cross section throughout its length and to the bar 16 is adapted to be connected a disk supporting arm presently described. Of course it is to be understood that one or more disk supporting arms may be employed should the occasion require, but for the sake of brevity only a single disk supporting arm will be presently described.

Carried by the frame 10 is a substantially U-shaped crank axle 19 on the spindle ends 20 of which are mounted the usual ground wheels 21 for the supporting of the frame and permitting the travel thereof over the ground.

The disk supporting arm comprises a casting forming a limb or beam 22, the same being slightly downwardly arched at its under side to give the proper curvature thereto, and to accommodate a recess 23, formed in the upper side thereof intermediate its ends, the inner end of the limb or beam 22 being formed with a bifurcation providing spaced parallel ears 24, while its opposite end is transversely split to provide a separable bearing boxing 25, the latter being formed with a longitudinal bore 26 and likewise the inner end is provided with a longitudinal bore 27 alining with the bore 26 and opening into the bifurcation in the inner end of the arm. Arranged within the bifurcated end of the arm between the ears 24 are stationary and movable clamping blocks 28 and 29 respectively both being formed in their meeting faces with V-shaped alining notches 30, in which is received the bar 16, the block 29 being held fast between the ears 24 by means of a securing bolt 31 passed through the ears 24 and the said block 29. This bolt 31 carries an ordinary nut 32 for the fastening thereof in the ears. The blocks 28 and 29 are formed with guide flanges 33 at opposite sides thereof which engage the ears 24 to prevent lateral displacement of the said block or the turning of the same between the ears. Formed on the block 28 is a circular-shaped shank 34 the same being slidably fitted within the bore 27, and has riveted therein a threaded knuckle rod 35, engaged in a turning knuckle 36 located within the recess 23 in the limb or beam 22.

Rotatably engaged in the box 25 is the circular-shaped shank 37 of a fork 38 which is located at the outer end of the limb or beam 22, the shank 37 being formed at its free end with a circular head 39 provided with clutch teeth 40, engageable with similar clutch teeth 41 formed on the wall adjacent thereto of the recess 23 in the limb or beam 22, so that the fork can be sustained locked in adjusted position when the clutch teeth are engaged with each other. Mounted within the fork 38 are stationary and movable clamping blocks 42 and 43 respectively, the same being formed with alining semi-circular shaped notches 44 provided with ratchet ribs or teeth 45 engageable with corresponding teeth or ribs 46 formed on a turning hub 47 engaged in the notches 44, between the said blocks 42 and 43, the block 43 being formed with a threaded knuckle rod 48 loosely passed through the shank 37 of the fork 38 and adjustably engaged in the knuckle 36, thus, it being seen that the movable blocks 28 and 43 will be moved in the direction of the stationary blocks on the turning of the knuckle 36 in one direction, thereby clamping the bar 16 and the hub 47 respectively. The hub 47 is formed at one end with an annular flange 49, while at its opposite end is provided a spindle housing 50 in which is journaled a disk supporting spindle 51, the latter carrying at one end a cotter pin 52 working against a washer 53 interposed between it and the end adjacent thereto of the housing 50, while the opposite end of the spindle 51 is formed with a circular-shaped head 54 to which is fixed the cultivator disk 55, the latter being riveted, bolted, or otherwise fixed thereto for the mounting of the same thereon.

Formed centrally in the hub 47 is an oil conduit or passage 56, the same opening into the bore receiving the spindle 51, and this oil conduit or passage 56 is supplied with lubricant from an oil cup 57 threaded in the said conduit or passage at the other end thereof.

The stationary block 42 is fastened within the fork 38 by means of a bolt 58 passed through the fork and the said block and carries an ordinary nut 59 for the securing of the bolt therein. The boxing 25 is fastened upon the limb or beam 22 by means of a series of bolts 60 which are passed upwardly through the limb or beam and also through the boxing 25, the bolt 60 being engaged by the usual nut 61 for the securing thereof to the limb and boxing as usual.

It is evident that by turning the knuckle 36 in the reverse direction to that previously mentioned the movable blocks 28 and 43 will be shifted away from the stationary blocks 29 and 42, thus, permitting the hub 47 to be turned for the angular adjustment of the disk 55 or the shank 37 may be readily turned in the split boxing for the raising or lowering of the disk 55 with respect to the ground. Furthermore, if desired the limb or beam can be adjusted on the bar 16 should the occasion require.

From the foregoing description, taken in connection with the accompanying drawings, it is thought that the construction and operation of the invention will be clearly understood, and therefore, a more extended explanation has been omitted.

What is claimed is:—

1. A supporting arm for a cultivator disk comprising a limb having a bifurcation at one end and a split boxing at its opposite end, a shank journaled in said boxing and having a fork, a movable clamping block engaged in the bifurcation in the limb, a movable clampably engaged in the limb, a movable clamping block carried by the fork, knuckle rods extending from said movable blocks and engaged in the shanks toward the center of the limb, a turning knuckle engaging the said rods, stationary blocks mounted in the bifurcated ends of the limb and the fork respectively and coöperative with the movable blocks, a turning hub engaged between the stationary and movable blocks in the fork, a spindle housing formed on said hub, a spindle journaled in said housing and adapted to support a disk, and means on the shank of the fork and engageable with the limb for locking the fork in adjusted position.

2. A supporting arm for a cultivator disk comprising a limb having a bifurcation at one end and a split boxing at its opposite end, a shank journaled in said boxing and having a fork, a movable clamping block engaged in the bifurcation and having a shank slidably engaged in the limb, a movable clamping block carried by the fork, knuckle rods extending from said movable blocks and engaged in the shanks toward the center of the limb, a turning knuckle engaging the said rods, stationary blocks mounted in the bifurcated ends of the limb and the fork respectively and coöperative with the movable blocks, a turning hub engaged between the stationary and movable blocks in the fork, a spindle housing formed on said hub, a spindle journaled in said housing and adapted to support a disk, means on the shank of the fork and engageable with the limb for locking the fork in adjusted position, and a rocking bar of a cultivator engaged between the stationary and movable blocks in the bifurcated end of the limb.

3. A supporting arm for a cultivator disk comprising a limb having a bifurcation at one end and a split boxing at its opposite end, a shank journaled in said boxing and having a fork, a movable clamping block engaged in the bifurcation and having a shank slidably engaged in the limb, a movable clamping block carried by the fork, knuckle rods extending from said movable blocks and engaged in the shanks toward the center of the limb, a turning knuckle engaging the said rods, stationary blocks mounted in the bifurcated ends of the limb and the fork respectively and coöperative with the movable blocks, a turning hub engaged between the stationary and movable blocks in the fork, a spindle housing formed on said hub, a spindle journaled in said housing and adapted to support a disk, means on the shank of the fork and engageable with the limb for locking the fork in adjusted position, a rocking bar of a cultivator engaged between the stationary and movable blocks in the bifurcated end of the limb, and means engaged in the hub for lubricating the said spindle.

4. A supporting arm for a cultivator disk comprising a limb having a bifurcation at one end and a split boxing at its opposite end, a shank journaled in said boxing and having a fork, a movable clamping block engaged in the bifurcation and having a shank slidably engaged in the limb, a movable clamping block carried by the fork, knuckle rods extending from said movable blocks and engaged in the shanks toward the center of the limb, a turning knuckle engaging the said rods, stationary blocks mounted in the bifurcated ends of the limb and the fork respectively and coöperative with the movable blocks, a turning hub engaged between the stationary and movable blocks in the fork, a spindle housing formed on said hub, a spindle journaled in said housing and adapted to support a disk, means on the shank of the fork and engageable with the limb for locking the fork in adjusted position, a rocking bar of a cultivator engaged between the stationary and movable blocks in the bifurcated end of the limb, means engaged in the hub for lubricating the said spindle, and means on the stationary and movable blocks in the fork and the hub respectively for engagement with each other to hold said hub against turning movement.

In testimony whereof I affix my signature in presence of two witnesses.

HENRY BROCKMEYER.

Witnesses:
 THOMAS L. HALE,
 DANIEL H. ARMSTRONG.